(12) United States Patent
Adelson et al.

(10) Patent No.: US 11,846,499 B2
(45) Date of Patent: Dec. 19, 2023

(54) RETROGRAPHIC SENSORS

(71) Applicant: GelSight, Inc., Waltham, MA (US)

(72) Inventors: Edward H. Adelson, Winchester, MA (US); F. Richard Cottrell, Westport, MA (US)

(73) Assignee: GelSight, Inc., Waltham, MA (US)

( * ) Notice: Subject to any disclaimer, the term of this patent is extended or adjusted under 35 U.S.C. 154(b) by 260 days.

(21) Appl. No.: 17/193,175

(22) Filed: Mar. 5, 2021

(65) Prior Publication Data

US 2021/0215474 A1 Jul. 15, 2021

Related U.S. Application Data

(63) Continuation of application No. PCT/US2019/049962, filed on Sep. 6, 2019.

(60) Provisional application No. 62/727,816, filed on Sep. 6, 2018.

(51) Int. Cl.
| | |
|---|---|
| *G01B 11/24* | (2006.01) |
| *G01B 1/00* | (2006.01) |
| *G01B 5/20* | (2006.01) |
| *G01B 11/30* | (2006.01) |
| *C08L 83/04* | (2006.01) |

(52) U.S. Cl.
CPC ............. *G01B 11/24* (2013.01); *G01B 1/00* (2013.01); *G01B 5/20* (2013.01); *G01B 11/303* (2013.01); *C08L 83/04* (2013.01); *C08L 2201/10* (2013.01)

(58) Field of Classification Search
CPC . G01B 11/24; G01B 1/00; G01B 5/20; G01B 11/303; C08L 83/04; C08L 2201/10
See application file for complete search history.

(56) References Cited

U.S. PATENT DOCUMENTS

| | | | | |
|---|---|---|---|---|
| 5,459,329 A | * | 10/1995 | Sinclair | G09B 25/06 250/341.8 |
| 5,798,181 A | | 8/1998 | Hobson et al. | |
| 8,823,639 B2 | * | 9/2014 | Jackson | G06F 3/0425 345/173 |

(Continued)

FOREIGN PATENT DOCUMENTS

| | | |
|---|---|---|
| JP | 2010095841 | 4/2010 |
| JP | 2011525284 | 9/2011 |

(Continued)

OTHER PUBLICATIONS

EPO, "EP Application No. 19857644.9 Search Report dated Apr. 14, 2022", 8 pages.

(Continued)

*Primary Examiner* — Dominic J Bologna
*Assistant Examiner* — Jarreas Underwood
(74) *Attorney, Agent, or Firm* — Strategic Patents, P.C.

(57) ABSTRACT

A retrographic sensor includes a clear elastomer substrate, a deformable reflective layer, and a contact surface with an array of rigid, non-planar features formed of a material or a pattern of particles to mitigate adhesion to a target surface while permitting the egress of trapped air around a region of interest. This combination of features permits the contact surface of the sensor to more closely conform to the target surface while physically transferring the topography of the target surface to the deformable layer for imaging through the substrate.

21 Claims, 5 Drawing Sheets

(56) References Cited

U.S. PATENT DOCUMENTS

| | | | |
|---|---|---|---|
| 2003/0178556 A1* | 9/2003 | Tachi | G01L 1/247 250/208.1 |
| 2009/0315989 A1* | 12/2009 | Adelson | G06F 18/00 348/135 |
| 2013/0033595 A1* | 2/2013 | Adelson | A61B 5/0077 362/296.01 |
| 2013/0272585 A1* | 10/2013 | Mueller | G06V 40/1318 382/124 |
| 2014/0104395 A1* | 4/2014 | Rohaly | G01L 1/24 348/47 |
| 2016/0171746 A1* | 6/2016 | Lilien | G01B 5/0004 348/46 |
| 2019/0394372 A1* | 12/2019 | Rohaly | G02B 7/022 |
| 2020/0012067 A1* | 1/2020 | Rohaly | G01B 11/303 |
| 2023/0072207 A1* | 3/2023 | Muthusamy | B25J 19/023 |

FOREIGN PATENT DOCUMENTS

| | | | |
|---|---|---|---|
| WO | WO-8403855 | 10/1984 | |
| WO | WO-8902722 A1 * | 4/1989 | |
| WO | WO-2013016729 A1 * | 1/2013 | A61B 5/0077 |
| WO | WO-2020051458 | 3/2020 | |
| WO | WO-2022191910 A1 * | 9/2022 | |

OTHER PUBLICATIONS

Rospatent, "RU Application No. 2021109187 Notification regarding the Unity of Invention and Search Report dated Mar. 30, 2022", 19 pages.

Rospatent, "RU Application No. 2021109187 Reissue Search Report dated Mar. 30, 2022", reissued to correct misprint in number of citation 20130033595 , 5 pages.

WIPO, "Application No. PCT/US19/49962 International Preliminary Report on Patentability dated Mar. 18, 2021", 9 pages.

ISA, "PCT Application No. PCT/US19/49962 International Search Report and Written Opinion dated Jan. 22, 2020", 12 pages.

JPO, "JP Application No. 2021-512669 Office Action dated Oct. 3, 2023", English and Japanese Translations, 10 pages.

* cited by examiner

RETROGRAPHIC SENSORS

CROSS-REFERENCE TO RELATED APPLICATIONS

This application is a bypass continuation that claims priority to International Patent Application No. PCT/US2019/049962 filed on Sep. 6, 2019, which claims priority to U.S. Provisional Application No. 62/727,816 filed on Sep. 6, 2018, where the entire content of each of the foregoing is hereby incorporated by reference.

FIELD

The present disclosure generally relates to retrographic sensors, and more specifically to contact sensors with engineered surfaces that facilitate use with various target surfaces.

BACKGROUND

A retrographic sensor includes a substrate of clear elastomer covered with a deformable layer containing reflective particles, along with an optical system for capturing images of the layer when it is distorted while pressing against an object. In order for the sensor to faithfully conform to a topographically complex target surface, the deformable layer must stretch, slide, and distort to match the target surface. If the sensor surface has a high coefficient of friction (COF), as is true for most elastomers, the sensor surface will not readily slide into and over the features of the target surface, and will not easily conform to the target surface. In addition, most elastomers will prevent trapped air from escaping. For example, if an elastomeric sensor is pressed onto a pit, it will form a seal around the rim of the pit, thereby trapping air within the pit. The trapped air prevents the sensor from reaching the bottom of the pit, and thus prevents accurate measurement. There remains a need for improved retrographic sensors that mitigate imaging defects associated with these characteristics.

SUMMARY

A retrographic sensor includes a clear elastomer substrate, a deformable reflective layer, and a contact surface with an array of rigid, non-planar features formed of a material or a pattern of particles to mitigate adhesion to a target surface while permitting the egress of trapped air around a region of interest. This combination of features permits the contact surface of the sensor to more closely conform to the target surface while physically transferring the topography of the target surface to the deformable layer for imaging through the substrate.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figures 1, 2, 3:
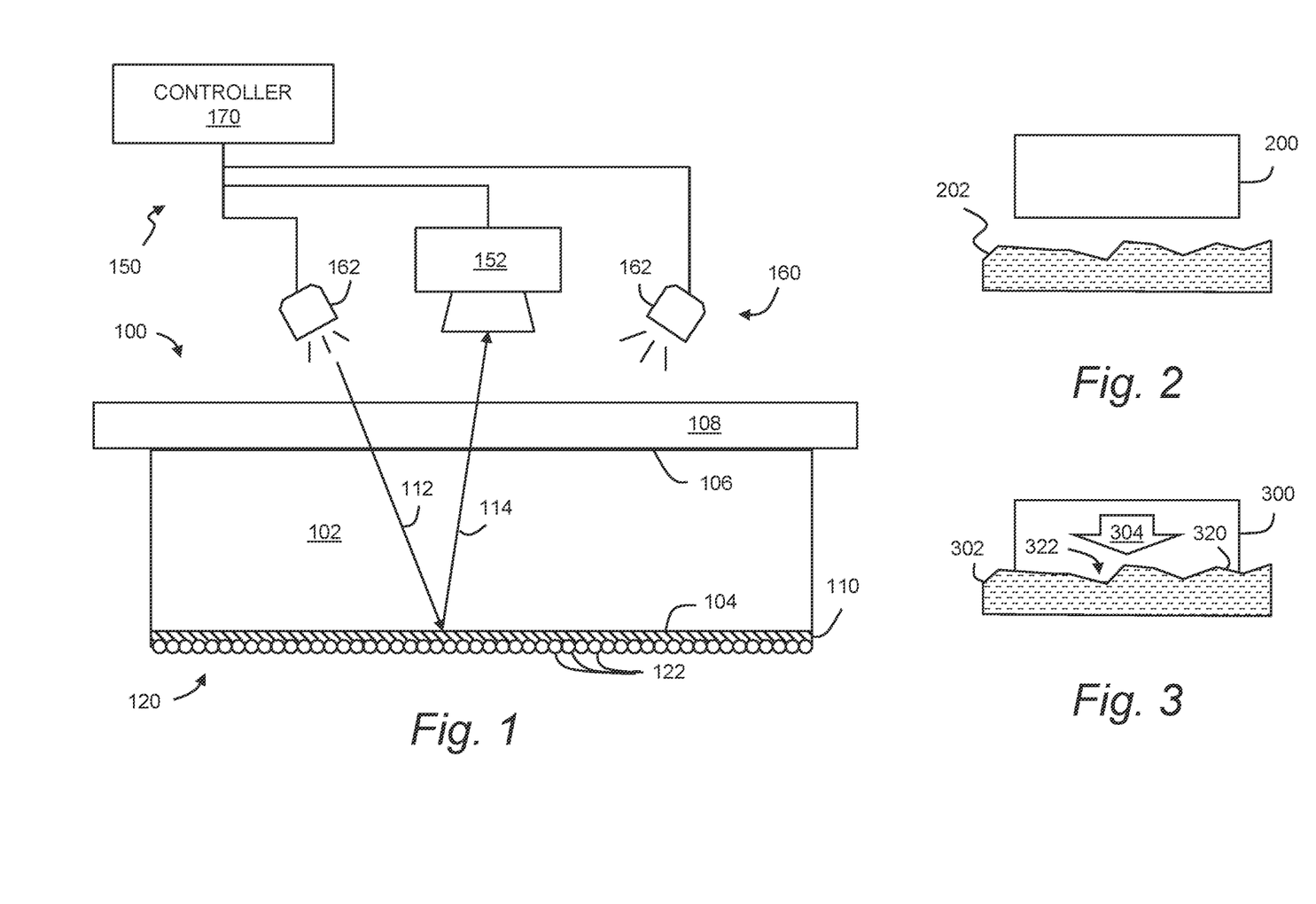
FIG. 1 shows an imaging system and a retrographic sensor.
FIG. 2 shows a retrographic sensor positioned for use.
FIG. 3 shows a retrographic sensor applied to a target surface.

FIG. 1 shows an imaging system and a retrographic sensor. In general, the retrographic sensor 100 may be used with the imaging system 150 to provide a contact-based imaging system for quantitative or qualitative topographical measurements for use in surface metrology or other three-dimensional imaging applications.

The retrographic sensor 100 may include a substrate 102 with a first surface 104 facing toward a target surface (not shown) and a second surface 106 facing toward the imaging system 150. The second surface 106 may, for example, be adjacent to a backing 108 for the substrate 102, with the backing 108 formed of a rigid, optically clear material such as glass, polycarbonate, or acrylic. The backing 108 generally transmits light to and receives light from the substrate 102 for imaging while permitting an application of force to engage the retrographic sensor 100 with the target surface in a manner that permits imaging of the target surface topography through the retrographic sensor 100.

The substrate 102 may be formed of any optically clear, deformable material suitable for transmitting light therethrough to facilitate imaging while also conforming to a target surface when the retrographic sensor 100 is placed against the target surface for use. For example, the substrate 102 may be formed of an elastomer capable of transmitting an image, and having a hardness suitable for conforming to contact surfaces. The hardness of the elastomer may be a Shore A hardness less than 40, or any other hardness suitable for conforming to target materials of interest. The elastomer of the substrate 102 may, for example, be an optically clear elastomer such as silicone rubber, polyurethane, plastisol, natural rubber, polyisoprene, and polyvinyl chloride, or any other thermoplastic elastomer or the like. In one aspect, the elastomer includes a styrenic block copolymer, e.g., with about 20% by weight of a styrene block copolymer and up to 80% by weight of a plasticizer or a ratio of 1:4 of styrenic block copolymer to plasticizer. More generally, polymer-to-plasticizer ratios of about 1:2 to about 1:9 may be usefully employed in this context. The plasticizer may include an oil and a tackifier, or any other suitable additives or other constituents.

While the first surface 104 is illustrated as substantially flat, it will be understood that other shapes may also or instead be used. For example, the first surface 104 may be convex (away from the imaging system 150), e.g., to provide greater freedom of orientation for a handheld sensor or the like.

The retrographic sensor 100 may also include a deformable layer 110, which may be disposed on the first surface 104 of the substrate 102. In general, the deformable layer 110 may include or be formed of a material that reflects light passing through the substrate 102 and incident on the first surface 104, as illustrated by a first arrow 112, in order to facilitate capture of images of the reflected light from the first surface 104 for use in image processing such as two-dimensional or three-dimensional imaging, as illustrated by a second arrow 114.

The deformable layer 110 may be formed of any of a variety of deformable materials such as any of the elastomers described herein. However, as distinguished from the substrate 102, the deformable layer 110 need not be optically clear, and preferably reflects on the surface facing the first surface 104 of the substrate 102 in order to facilitate imaging of the deformed surface of the retrographic sensor 100 during use. The deformable layer 110 may, for example, include reflective particles such as metallic particles disposed in a second elastomer. The deformable layer 110 may also or instead include non-metallic particles that impart suitable surface properties to the deformable layer 110 where it meets the first surface 104 of the substrate 102. For example, the deformable layer 110 may reflect light non-directionally, or substantially uniformly in all directions in order to mitigate biases that might otherwise occur when estimating surface normals or gradients based on the intensity of reflected light.

In one aspect, the deformable layer 110 may include titanium dioxide. The deformable layer 110 may also include carbon black, e.g., in an amount sufficient to impart a neutral gray to the titanium dioxide in the deformable layer 110. In another aspect, the deformable layer 110 may include red iron oxide. In another aspect, the material of the deformable layer 110 may include flakes that exhibit at least one of surface roughness, irregular shape, and random alignment relative to each other that causes the material to reflect light moderately directionally, or the material of the deformable layer 110 may include flakes that are substantially flat, have a mirror-like surface, and are substantially well aligned relative to each other, thereby causing the material to reflect light highly directionally. In this latter embodiment, the flakes may usefully include aluminum flake, bronze flake, or any other suitable metallic or other flake.

The retrographic sensor 100 may also include a contact surface 120 for placement in contact with an imaging target. In general, the contact surface 120 may include particles 122 disposed in a pattern on the deformable layer 110, and separated from the substrate 102 by the deformable layer 110. The particles 122 preferably have a hardness greater than the hardness of the first elastomer in the substrate 102 so that the particles 122 retain their shape when the retrographic sensor 100 is applied to a target surface with sufficient force to deform the substrate 102. In this manner, the array of particles 122 can create air channels for redistribution and egress of air or other trapped gasses when the retrographic sensor 100 is applied to a target surface. In order to retain the structure of air channels while minimizing the impact on resolution of an acquired image, the pattern may usefully form a single layer of the particles on the deformable layer 110, e.g., as illustrated in FIG. 1.

The particles may have a Shore A hardness greater than 40, or more generally, greater than a corresponding hardness of the elastomer of the substrate 102. For example, the elastomer of the substrate 102 may have a Shore A hardness at least 10 less than the Shore A hardness of the particles. Similarly, the Shore A hardness of the deformable layer 110 may be less than the Shore A hardness of the particles 122, and may be greater than or equal to the Shore A hardness of the substrate 102. It will be appreciated that the elastic modulus or similar measures describe a bulk property of materials, and may be useful in some instances for distinguishing relatively pliable materials used for the substrate 102 or the deformable layer 110 from relatively rigid materials of the particles 122 disposed on the deformable layer 110. However, hardness as measured, e.g., using the Shore A scale as described herein, may vary according to location within an object. In this context, the Shore A hardness of the substrate 102 may be usefully measured at a surface of the substrate 102 without the deformable layer 110 applied thereto, and may be measured at a center of the first surface 104 of the substrate 102 or at any other suitable location. More generally, the Shore A hardness of the various materials or components of the retrographic sensor 100 may be measured in any manner that provides a useful signal for ensuring that the relative hardness of the substrate 102, the deformable layer 110, and the particles 122 cooperate to permit deformation of the retrographic sensor 100 to a target surface while retaining the advantageous properties of the contact surface 120 described herein.

The imaging system 150 may be coupled to the second surface 106 of the substrate 102, e.g., through the backing 108 and any other hardware for securing the imaging system 150 in a position to capture images reflected from the deformable layer 110 through the substrate 102. In general, the imaging system 150 may include one or more cameras 152 using, e.g., optical sensors such as charge-coupled devices, complementary metal-oxide semiconductor image sensors, N-type metal-oxide semiconductor image sensors, or the like, along with any suitable lenses and other optical elements to focus incident light toward these sensors to facilitated image capture. In general, the one or more cameras 152 may be configured to capture a plurality of images of the deformable layer 110 through the first elastomer of the substrate 102 in order to obtain images of incident light. A camera 152 may use pixel-by-pixel color filters, or other controllable filters or the like to selectively image incident light of a particular wavelength or band of wavelengths.

An illumination system 160 including one or more light sources 162 such as light-emitting diodes may also be included. The illumination system 160 may, for example, be configured to illuminate the deformable layer 110 through the elastomer of the substrate 102, e.g., with a grazing illumination or any other directional illumination that facilitates detection of changes in a surface normal of the deformable layer 110. In one aspect, the illumination system may provide illumination with two or more light sources 162, each of the light sources 162 illuminating with a different wavelength band from a different direction. When used in combination with one or more cameras 152 that capture images within corresponding wavelength ranges, this type of illumination may be used to illuminate the deformable layer 110 from different directions at different wavelengths, and capture separate images each illuminated from a different directions simultaneously. For example, three light sources 162 in red, green, and blue wavelength bands may be used with a color camera having similarly filtered imaging channels to simultaneously image a surface with illumination from three different directions.

A controller 170 such as a microprocessor, microcontroller, or other programmable or dedicated circuitry (or combination of the foregoing) may be used to coordinate operation of the imaging system 150 and the illumination system 160 to capture images of the illuminated deformable layer 110, and to process the resulting images to reconstruct the topography of the underlying target surface, for example by evaluating surface normals based on the intensity of illumination received at the cameras 152, and using surface normals to reconstruct surface topography.

FIG. 2 shows a retrographic sensor positioned for use. The retrographic sensor 200, which may be any of the retrographic sensors described herein, may be positioned for use above a target surface 202 from which a topographical image or other quantitative or qualitative image is desired.

FIG. 3 shows a retrographic sensor applied to a target surface. As the retrographic sensor 300, which may be any of the retrographic sensors described herein, is positioned for imaging by lowering onto a target surface 302, as illustrated generally by an arrow 304, a contact surface 320 of the retrographic sensor 300, such as any of the contact surfaces described herein, may deform and conform to the target surface 302. As a significant advantage, the contact surface 320 may be configured, e.g., through material selections or the introduction of particles as described herein, to present a relatively low coefficient of friction so that the contact surface 320 can slide over the target surface 302 and more readily conform to the target surface 302 without artifacts introduced by gripping and elastic strain where the contact surface 320 meets the target surface 302. As another significant advantage, the contact surface 320 may be configured as described herein to provide air channels for the egress of air or other gasses or fluids as the contact surface 320 surrounds and moves into topographically varied regions of the target surface 302 such as a recess 322 that might otherwise trap gas in a manner that interferes with accurate surface measurements using the retrographic sensor 300.

As the contract surface 320 of the retrographic sensor 300 is geometrically altered in response to contact with the target surface 302, the geometric alterations cause localized changes in the surface normal and associated localized changes in the amount of light reflected from the deformable layer (not shown) toward imaging devices such as the cameras 152 described above with reference to FIG. 1. This image data may be analyzed to reconstruct the three-dimensional shape of the target surface 302 contacting the deformable layer 110, or the image data may otherwise be processed to extract and/or present two-dimensional or three-dimensional data. A variety of suitable configurations and imaging techniques are possible using the retrographic sensors and associated hardware described herein. For example, referring to FIG. 1, the controller 170 may implement a photometric stereo analyzer configured to estimate at least one of a surface normal and a surface height of the deformable layer 110 at a plurality of positions using a first image of the deformable layer 110 captured with the camera(s) 152 at a first color and a second image of the deformable layer 110 captured with the camera(s) 152 at a second color, or more generally to extract three-dimensional data using two or more images of the deformable layer captured in two or more different wavelength ranges. The controller 170 may implement an illumination controller, e.g., with computer executable code executing on the controller 170, for sequentially illuminating the first surface 104 through the substrate 102 with two or more different light sources 162, each at a different position.

Figure 4:
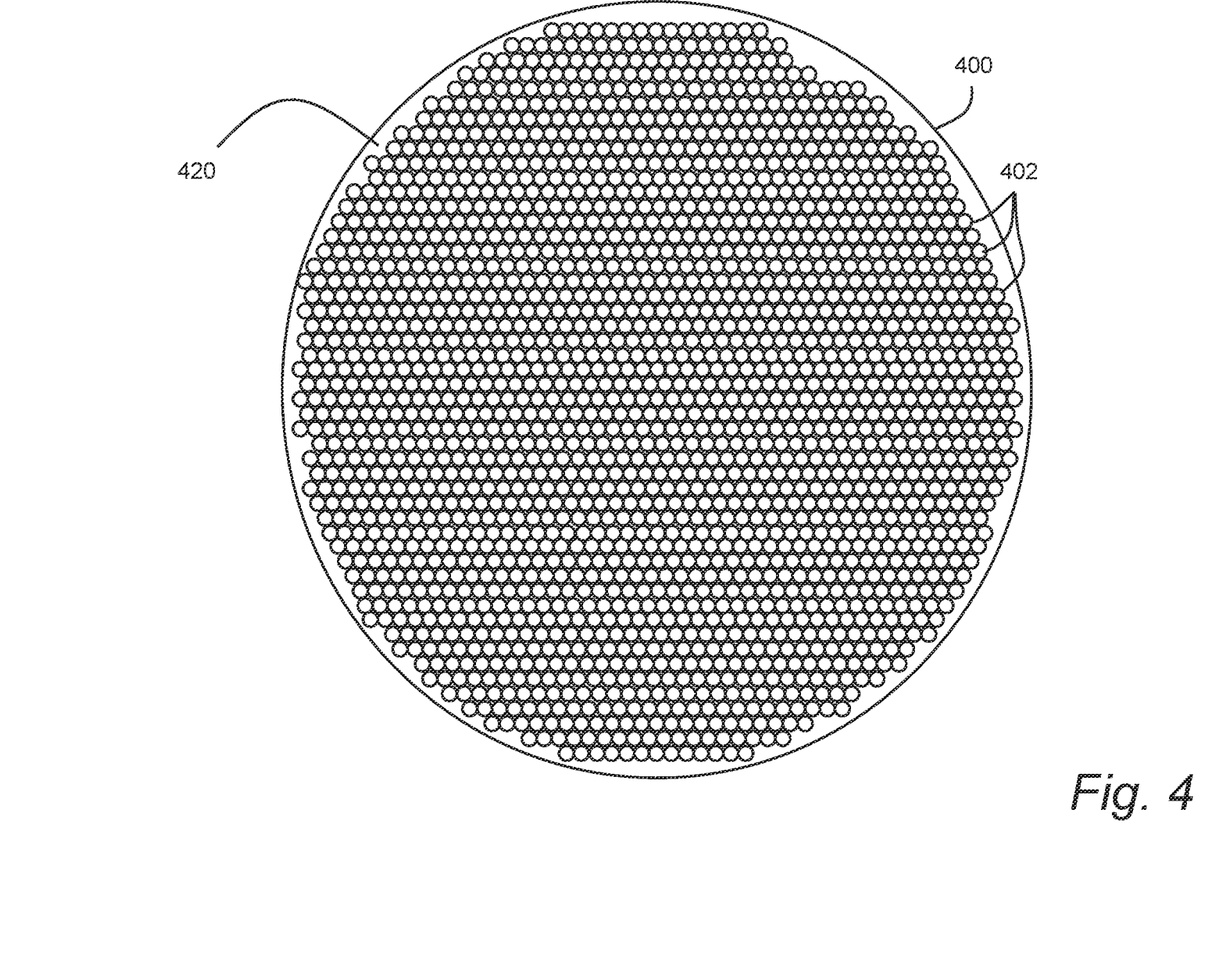
FIG. 4 shows a contact surface of a retrographic sensor.

FIG. 4 shows a contact surface of a retrographic sensor. In general, the retrographic sensor 400, which may be any of the retrographic sensors described herein, may include a number of particles 402 arranged in a pattern to form some or all of a contact surface 420 of the retrographic sensor 400. Such a pattern is depicted in FIG. 4 as a normal view of an x-y plane parallel to the contact surface 420. It will be understood that, while the particles 402 are illustrated as circles, these circles are not necessarily to scale, and the size and shape of the particles may vary according to an intended use. The diameter of the particles 402 may, for example, be between one and twenty five microns, or more generally of dimensions at or below a desired imaging resolution for the retrographic sensor 400.

In general, the pattern may form a closely spaced array, which may be a regular array, such as a square or hexagonal array, or an irregular array. In one aspect, the pattern may be a substantially hexagonal array, e.g., generally hexagonal with various interstitial irregularities that do not prevent most of the particles 402 from contacting six other adjacent particles 402. The pattern may also or instead include a plurality of locally hexagonal arrays coupled by other arrays of particles 402 that span the regions between otherwise hexagonal regions. A variety of objective measures of regularity have been devised such as nearest neighbor distances. In one aspect, the regularity of a hexagonal array for substantially equally-sized particles 402 may be evaluated based on the average number of contacts with adjacent particles 402 (e.g., closer to six contact points implies a more regular array).

While regularity implies good, consistent coverage of the contact surface 420 in a manner that facilitates imaging, any other pattern of closely spaced particles 402, e.g., irregular patterns, may also or instead be used, provided that the particles 402 are sufficiently close to one another to rigidly maintain physical channels therebetween for egress of gas when the contact surface 420 is pressed against a target surface. That is, the pattern of particles 402 may advantageously form interstitial channels that permit a flow of air between the particles 402 on a side opposing the deformable layer of the retrographic sensor 400, e.g., on the contact surface 420, in order to avoid trapped pockets of air or other gas that might otherwise interfere with accurate imaging of a target surface. Furthermore, the particles 402 may generally contact one another within the pattern, e.g., in direct contact, or the particles 402 may be separated, either due to a lower packing density or because the particles 402 are physically separated by a layer of adhesive or interstitial elastomer, e.g., from the deformable layer.

The particles 402 may have a variety of size ranges and distributions. In one aspect, the particles 402 are monodisperse, or substantially monodisperse. The particles 402 may more specifically be monodisperse spheres so that the particles 402 tend to arrange within a plane into a substantially hexagonal array. In one aspect, the particles 402 may have an average diameter of about five microns. In another aspect, the particles 402 may have an average diameter in a range between three and ten microns, or between one and twenty five microns. As noted above, the particles 402 are preferably no larger in diameter than a desired imaging resolution for a device using the retrographic sensor 400. In another aspect, the particles 402 may include non-spherical particles with a largest diameter within the ranges noted above. In general, any such shape may be used provided the shapes do not pack in such a dense manner that interstitial channels for the escape of air become occluded.

Polydisperse particles may also or instead be used. For example, the particles 402 may be polydisperse with a first standard deviation about a mean particle size defining a range falling within a range of one to ten microns. The degree of polydispersity may be characterized in other ways. For example, a dimensionless metric such as the coefficient of variation ($c_v$) or relative standard deviation may be used:

$$c_v = \frac{\sigma}{\mu} \quad [\text{Eq. 1}]$$

where $\sigma$ is the standard deviation for a distribution of particle sizes and $\mu$ is the mean. These values are commonly reported by commercial providers of bulk microspheres and other particles of interest.

In general, more consistently shaped particles will form more regular arrays than other distributions (except in certain cases of bimodal distributions or other specific distributions that can potentially yield regularly packed arrays), and will mitigate related defects in imaging. Thus a low coefficient of variation (e.g., 0% for perfectly monodisperse particles) serves as a figure of merit that relates particles size distributions to the performance of retrographic sensors. Empirically for microspheres on the order of one to ten microns, a coefficient of variation that is near 0% is preferable. However coefficients of variation between 15-25% also yield acceptable results, with differentiable imaging performance within that (15-25%) range. Of course, more disperse particles 402 may also be used, and such particle distributions might still yield certain advantages such as interstitial channels for air egress and a lower coefficient of friction. However these more disperse particles 402 may also result in a loss of imaging resolution disproportionate with the mean particle size, as well as other imaging artifacts that impede accuracy of images and reconstructions using the resulting retrographic sensor.

The particles 402 may be formed of a variety of materials including polymers, natural polymers, and minerals. For example, the particles 402 may usefully be formed of, or include, polymethylsilsesquioxane. Polymethylsilsesquioxane (PMSQ) provides certain advantages when used as particles 402 in the contact surface 420. PMSQ has a relatively low coefficient of friction, it is rigid (relative to an elastomer substrate), and microspheres of PMSQ are readily commercially available in narrow size distributions. However, non-spherical particles may also or instead be used, and the particles 402 may usefully be formed of other types of materials. For example, the particles 402 may be formed of a silica, a glass, a melamine, a polystyrene, a polymethylmethacrylate, a polybutylmethacrylate, a styrene/acrylate copolymer, a cellulose, and a polylactic acid. The particles 402 may also or instead be formed of a nylon or a polytetrafluoroethylene. More generally, any rigid material that is available in suitable sizes and shapes may be used as particles 402 in a contact surface 420 as contemplated herein. Other suitable and commercially available microparticles include but are not limited to microspheres formed of methyl methacrylate crosspolymer, polybutyl acrylate and silica, lauryl methacrylate/glycol dimethacrylate crosspolymer and acrylates/ethylhexyl acrylate/dimethicone methacrylate copolymer, HDI/trimethylol hexyllactone crosspolymer and silica, HDI/trimethylol hexyllactone crosspolymer and silica, ethylene/acrylic acid copolymer, polyethylene, nylon-6, nylon-12, calcium silicate, vinyl dimethicone/methicone silsesquioxane crosspolymer, and combinations of the foregoing.

Figure 5:
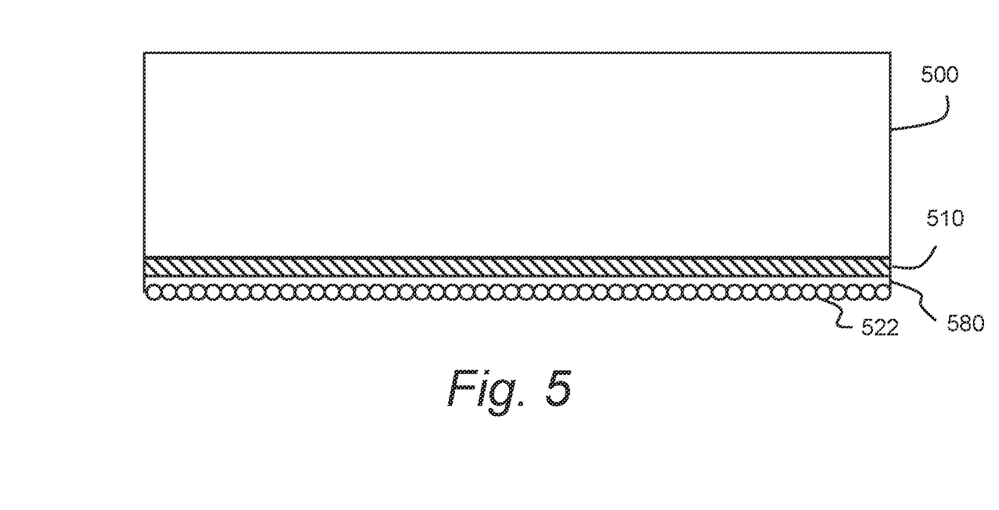
FIG. 5 shows a side view of a retrographic sensor.

FIG. 5 shows a side view of a retrographic sensor. The retrographic sensor 500 may be any of the retrographic sensors described herein, except as otherwise noted. While the particles 522 of the retrographic sensor 500 may be at least partially embedded in a deformable layer 510, e.g., as described above, the particles 522 may also or instead be secured to the deformable layer 510 by an adhesive 580 such as a polyurethane, or otherwise indirectly coupled to the deformable layer 510 through one or more intermediate layers. In general, the particles 522 may extend out of the adhesive 580 in order to benefit from any associated, low coefficient of friction, as well as the resulting interstitial channels, although the amount of the particles 522 extending beyond the adhesive 580 may depend on a number of factors such as the strength of the adhesive 580 and the shape of the particles 522. In one aspect, the particles 522 may be spherical particles, and may extend by at least one half of their diameter above the layer of adhesive 580 joining the particles 522 to the deformable layer 510.

Figure 6:
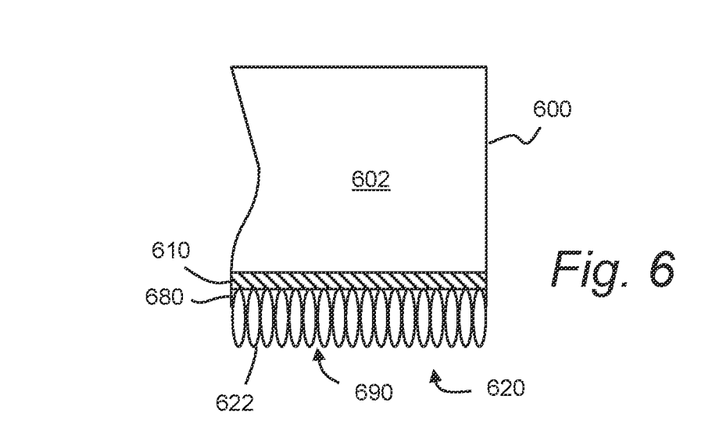
FIG. 6 shows a side view of a retrographic sensor.

FIG. 6 shows a side view of a retrographic sensor. The retrographic sensor 600 may be any of the retrographic sensors described herein, except as otherwise noted. While the particles described herein can provide one possible contact surface, the retrographic sensor 600 may more generally include a contact surface 620 disposed on a deformable layer 610 having non-planar features 622 forming interstitial channels 690 that permit a flow of air between the non-planar features 622. These non-planar features 622 may usefully have a hardness greater than the substrate 602 in order to consistently transfer the topography of a target surface into the deformable layer 610 and substrate 602 upon contact, as well as a coefficient of friction less than the deformable layer 610 in order to facilitate movement of the contact surface 620 along a target surface when the retrographic sensor 600 is positioned for use on the target surface.

The non-planar features 622 may include particles disposed on the deformable layer 610 as described herein. The non-planar features 622 may also or instead include pillars extending from the deformable layer 610. The hardness of the non-planar features 622 may be greater than the deformable layer 610. The non-planar features 622 may generally extend normal to the surface of the substrate 602, e.g., with vertical walls, or the non-planar features 622 may be curved, angled, or otherwise variably shaped along an axis parallel to the substrate normal. While a variety of such features may be created by embedding particles or other discrete objects into the deformable layer 610 (or an adhesive 680 coupled to the deformable layer 610), the non-planar features 622 may also or instead be formed in the deformable layer 610. For example, an array of protrusions can be molded directly into the deformable layer 610, e.g., by constructing a mold of an array of small depressions and filling the depressions with a material that cures to provide a relatively hard surface with a relatively low coefficient of friction. These filled depressions can then be transferred and attached to a sensor surface, at which point they form an array of non-planar features 622 providing similar advantages to the particles described herein.

Figure 7:
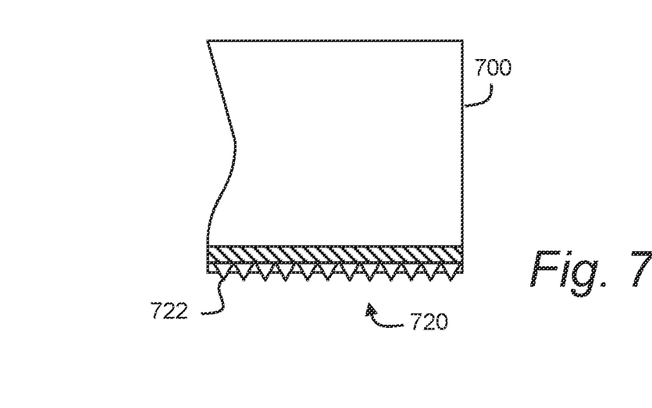
FIG. 7 shows a side view of a retrographic sensor.

FIG. 7 shows a side view of a retrographic sensor. The retrographic sensor 700 may be any of the retrographic sensors described herein, except as otherwise noted. The retrographic sensor 700 may include a number of non-planar features 722 for improved imaging as described herein. In one aspect, the non-planar features 722 may include tapered structures extending from the deformable layer. The tapered structures may, for example, include pyramids, cones, truncated cones, or any other tapered structures or the like. High aspect structures may impose artifacts based on the shear forces on the contact surface 720 of the retrographic sensor 700, and are preferably avoided unless the detection of such forces is intended or helpful for a particular imaging application.

Figure 8:
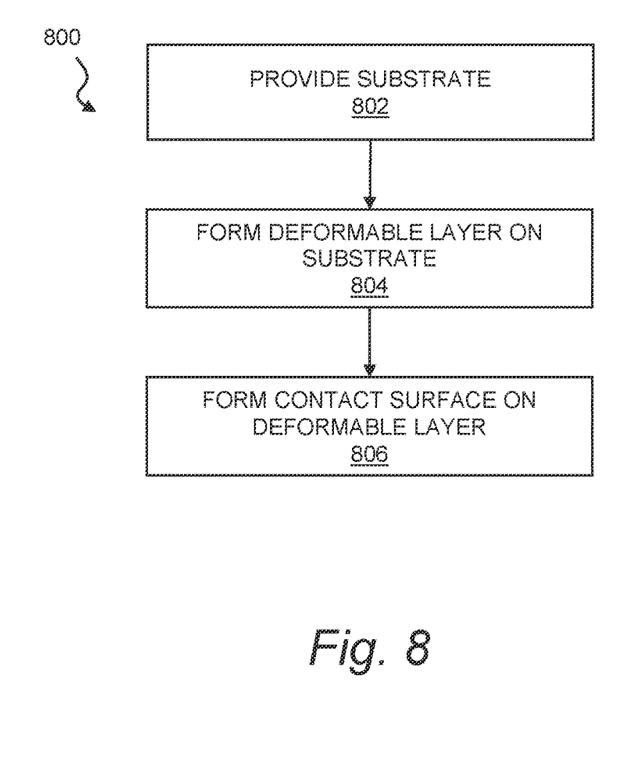
FIG. 8 shows a flowchart of a method for fabricating a retrographic sensor.

FIG. 8 shows a flowchart of a method for fabricating a retrographic sensor.

As shown in step 802, the method 800 may begin with providing a substrate formed of an elastomer capable of transmitting an image as described herein. This may include a substrate formed of a block of clear polystyrene copolymer elastomer about 3 mm thick, or a substrate of any other dimensions and materials suitable for imaging as contemplated herein.

As shown in step 804, the method 800 may include forming a deformable layer on the substrate, such as a 2.33 micron layer of deformable material including a red iron oxide pigment, or any of the other deformable layer materials described herein, such as a deformable material that non-directionally reflects light passing through the substrate and incident on a surface of the substrate adjacent to the deformable layer. The deformable layer may be formed, e.g., by spin coating the deformable material onto the substrate or otherwise disposing a layer of the deformable material onto the substrate, or by molding the substrate onto a pre-formed layer of the deformable material. The deformable layer may also or instead be coated with a 1 micron layer of antiabrasion thermoplastic elastomer (on the side opposing the substrate), which usefully provides a tacky surface for adhering microspheres or other particles.

As shown in step 806, the method 800 may include forming a contact surface such as any of the contact surfaces described herein on the deformable layer. For example, the contact surface may be configured to contact a target surface for imaging with a retrographic sensor. For example, the contact surface may include particles harder than the substrate and disposed in a pattern on the deformable layer and separated from the substrate by deformable layer.

In one aspect, this may include applying a powder of six micron, monodisperse microspheres of polymethylsilsesquioxane to the deformable layer in a manner that distributes the powder into a closely packed monolayer. Forming the contact surface may also or instead include applying an aqueous polyurethane suspension or other adhesive to the surface, and allowing the adhesive to spread and wet the deformable layer and the microspheres. For example, spin coating may be used to apply the aqueous polyurethane to the deformable layer, subject to suitable coordination of spin coater rotational velocity and viscosity of the suspension (or concentration of microspheres in the concentration, or any other proxy for viscosity or flow).

In another aspect, forming the contact surface may include applying the particles onto the deformable layer in an aqueous solution of polyurethane. In another aspect, this may include spin coating a mixture of an adhesive and particles such as monodisperse particles of polymethylsilsesquioxane onto the deformable layer. In any case, forming the contact surface may also include drying the adhesive to provide an array of particles with exposed top surfaces and bottom portions adhered to the thermoplastic elastomer material of the deformable layer.

As noted above, the deformable layer or the elastomer of the substrate may include a tackifier that facilitates adhesion of the particles. In this case, as described above, forming the contact surface may include applying a layer of the particles to the deformable layer and then flowing an aqueous polyurethane or other suitable adhesive onto the particles. By way of non-limiting example, the particles may have sizes ranging from about one to twenty five microns. In one aspect, the particles include monodisperse polymethylsilsesquioxane particles. In another aspect, the particles include polydisperse polymethylsilsesquioxane. More generally, the particles may include any of the particles described herein including particles of various shapes, dimensions, materials, sizes, and size distributions.

Figure 9:
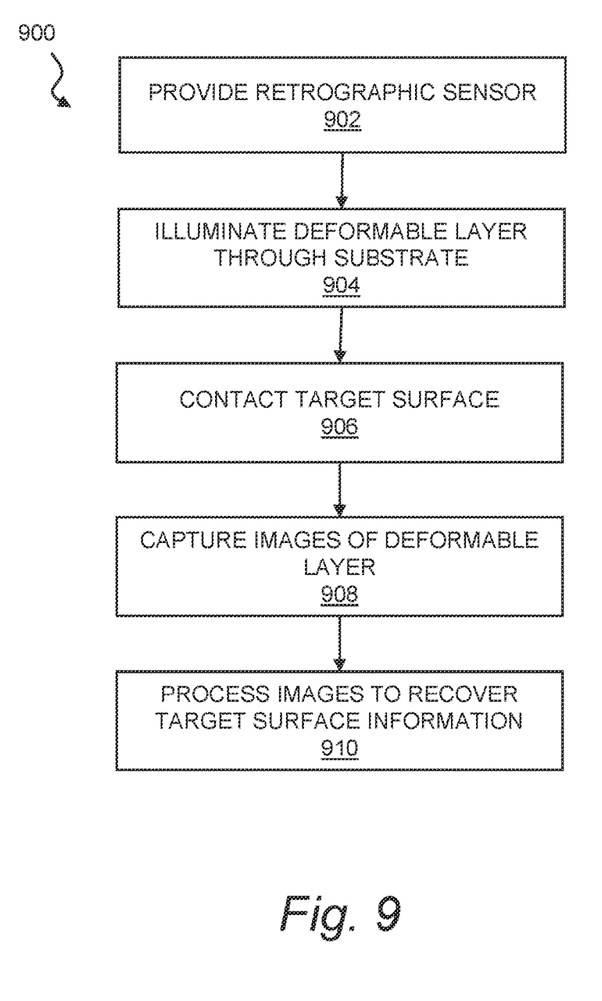
FIG. 9 shows a flowchart of a method for surface metrology using a retrographic sensor.

FIG. 9 shows a flowchart of a method for surface metrology using a retrographic sensor.

As shown in step 902, the method 900 may include providing a retrographic sensor such as any of the retrographic sensors described herein. By way of non-limiting example, the retrographic sensor may include a substrate, a deformable layer, and a contact surface. The substrate may be formed of a first elastomer capable of transmitting images and having a first hardness. The deformable layer may be disposed on a first surface of the substrate, and may include a material reflecting light incident on the first surface of the substrate. The contact surface may provide a surface for placement in contact with an imaging target, and may be formed by a pattern of particles disposed on the deformable layer and separated from the substrate by the deformable layer. The particles of the contact surface may have a second hardness greater than the first hardness of the first elastomer of the substrate.

As shown in step 904, the method 900 may include illuminating the material of the deformable layer with a light source such as a light emitting diode or array of light emitting diodes from a side facing the substrate.

As shown in step 906, the method 900 may include contacting the contact surface of the retrographic sensor to a target surface to geometrically alter the deformable layer.

As shown in step 908, the method 900 may include capturing an image of the deformable layer from the side facing the substrate while illuminating the material and contacting the contact surface to the target surface. This may also or instead include capturing a number of images to provide side illumination for different angles, which may increase accuracy, provide additional information about occluded surface, and otherwise improve the quantitative accuracy of reconstructed three-dimensional images resulting therefrom.

As shown in step 910, the method 900 may include processing images to recover target surface information such as surface topography or other two-dimensional or three-dimensional information. In one aspect, this includes analyzing an image (or a plurality of images) to determine a three-dimensional geometry of the target surface, for example by inferring surface normals from the intensity of reflected light, and integrating surface normals to determine a height of the target surface at locations within the image. This may also or instead include analyzing a plurality of images obtained, e.g., with different angles or directions of grazing illumination. Thus for example, the method 900 may include illuminating the deformable layer from two or more different directions, capturing the image of the deformable layer while illuminated from each of the two or more different directions, and analyzing a resulting plurality of images to determine the three-dimensional geometry of the target surface.

In another aspect, the imaging system may be channelized using color, e.g., to support simultaneous imaging of illumination from different directions. Thus for example, the method 900 may include illuminating the deformable layer simultaneously with a first light source of a first color and a second light source of a second color different from the first color. In this aspect, the method 900 may further include capturing a multi-color image of the deformable layer, distinguishing between a pattern of illumination from the first light source and the second light source, and analyzing the multi-color image to determine the three-dimensional geometry of the target surface based on the pattern of illumination from the first light source and the second light source. More generally, a number of different colors may be used, and in particular, three different colors such as red, green, and blue may be readily discriminated by commercially available optical systems such as color cameras or color image sensors, and may be used to channelize the imaging system to support simultaneous imaging of illumination from three different directions at the same time, e.g., in a single color image.

Figure 10:
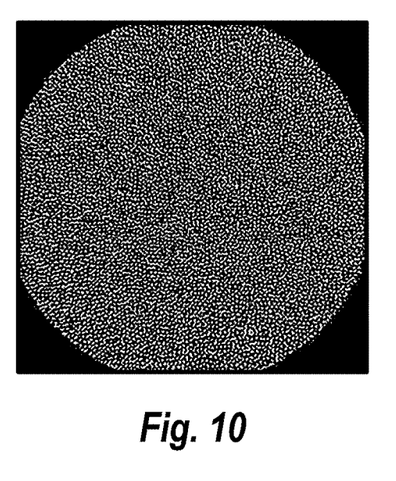
FIG. 10 shows an optical microscope image of an array of 6 micron microspheres of a first type.
Figure 11:
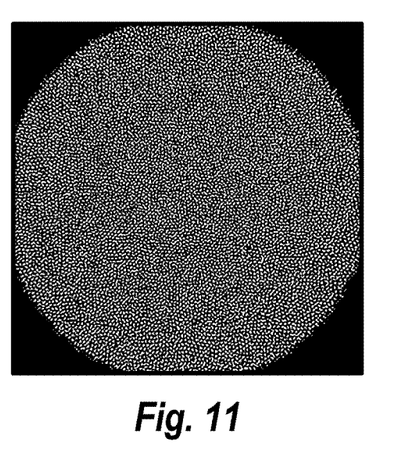
FIG. 11 shows an optical microscope image of an array of 6 micron microspheres of a second type.

FIG. 10 shows an optical microscope image of an array of 6 micron microspheres of a first type and FIG. 11 shows an optical microscope image of an array of 6 micron microspheres of a second type. In general, the microspheres of FIG. 11 (Type A) are known to be more monodisperse, e.g., with a more consistent diameter, than those of FIG. 10 (Type B) and are thus expected to create a more regular pattern when packing into a two-dimensional array, e.g., when applied as a monolayer to a contact surface of a retrographic sensor.

Figure 12:
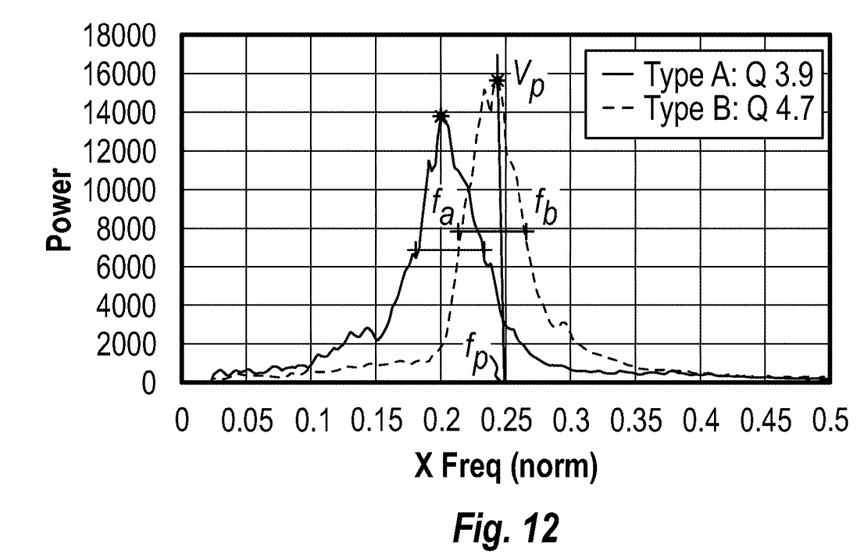
FIG. 12 shows an average radial power spectrum for the microsphere arrays of FIGS. 10 and 11.

FIG. 12 shows an average radial power spectrum for the microsphere arrays of FIGS. 10 and 11. While a number of techniques may be used to measure regularity of geometric structures, the power spectrum of the imaged surfaces presents a useful metric for evaluating the suitability of a particle pattern for high-resolution, error-free imaging. In order to derive this quantity, optical microscope images of the contact surface may be bandpassed and thresholded to enhance contrast, yielding images such as those depicted in FIGS. 10-11. The bandpassed, thresholded images (such as those in FIGS. 10-11) may then be multiplied by a Gaussian window to minimize edge artifacts (from the black border of the images), resulting in a convolution of the frequency domain representation of the images with a Gaussian window. The magnitudes of the frequency domain representation may then be squared to obtain a two-dimensional power spectrum. In general, the power spectrum of a less regular pattern of particles is expected to have a lower frequency and a wider band of strong frequencies than the more regular pattern. These characteristics can be quantified by evaluating the shape of the frequency domain band representing the dominant frequency of the array.

In general, the two-dimensional power spectrum will have radial symmetry, so the signals can be radially averaged, and the DC and other very low frequency components can be discarded. The resulting power spectra for the patterns in FIG. 10 (Type A) and FIG. 11 (Type B) are illustrated in FIG. 12. For these power spectra, a peak power $v_p$ may be located at a peak frequency $f_p$. The half power frequencies $f_a$ and $f_b$ are then defined as the frequencies above and below the peak frequency $f_p$ where the power is 50% of the peak power $v_p$. These values are labelled in FIG. 12 for the particles of Type B. With these values determined for the power spectrum of a particular pattern of particles, a Q score for the dominant frequency band can be define as:

$$Q = \frac{f_p}{f_a - f_b} \qquad [\text{Eq. 2}]$$

This Q score serves as a figure of merit for regularity, with a higher score indicating a more regular array of particles on the contact surface. Applying this formula to the patterns of FIGS. 10-11, the particles of Type B have a Q score of about 4.7, and are very good for imaging. The particles of Type A have a Q score of about 3.9 and are also suitable for imaging.

Empirically, a Q score above 2 for microspheres of 1-20 microns indicates a pattern that is sufficiently regular for use in a retrographic sensor without introducing significant imaging artifacts that impede accuracy or resolution. Thus, in one aspect, the contact surface of a retrographic sensor may usefully have a pattern of microspheres with a radially averaged two-dimensional power spectrum having a Q score of at least 2, where the Q score is equal to the peak frequency divided by the difference of the half power frequencies (of the radially averaged two-dimensional power spectrum). A Q score above 3 generally yields noticeably improved performance, and a Q score above 4.5 appears to yield the best possible imaging through a monolayer of particles. The Q score of 4.5 further suggests highly regular packing consistent with microspheres of relatively uniform size and shape (e.g., monodisperse). However, it should be understood that highly monodisperse particles may also yield a poor Q score under certain circumstances, such as where the particles are unevenly distributed, or where the particles only partially cover a surface leaving relatively large, open areas. In such cases, the contact surface may produce a low Q score (possibly an unusably low Q score) despite a high geometric regularity of the individual particles.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A retrographic sensor comprising:
   a substrate with a first surface, the substrate formed of a first elastomer capable of transmitting an image and having a first hardness;
   a deformable layer disposed on the first surface of the substrate, the deformable layer including a material that reflects light passing through the substrate and incident on the first surface; and
   a contact surface for placement in contact with an imaging target, the contact surface including particles disposed in a pattern on the deformable layer and separated from the substrate by the deformable layer, the particles are formed of polymethylsilsesquioxane, and the particles having a second hardness greater than the first hardness of the first elastomer.

2. The retrographic sensor of claim 1, wherein the pattern forms a single layer of the particles on the deformable layer.

3. The retrographic sensor of claim 1, wherein the pattern is a closely spaced array.

4. The retrographic sensor of claim 1, wherein the particles contact one another within the pattern.

5. The retrographic sensor of claim 1, wherein the pattern of the particles forms interstitial channels that permit a flow of air between the particles on a side opposing the deformable layer.

6. The retrographic sensor of claim 1, wherein the particles are monodisperse microspheres.

7. The retrographic sensor of claim 6, wherein the particles have an average diameter in a range between 3-10 microns.

8. The retrographic sensor of claim 1, wherein the particles are polydisperse with a first standard deviation about a mean particle size falling within a range of 1-10 microns.

9. The retrographic sensor of claim 1, the contact surface further including additional particles formed of one or more of a silica, a glass, a melamine, a polystyrene, a polymethylmethacrylate, a polybutylmethacrylate, a styrene/acrylate copolymer, a cellulose, a nylon, a polytetrafluoroethylene, and a polylactic acid.

10. The retrographic sensor of claim 1, wherein the first hardness of the first elastomer is a Shore A hardness less than 40.

11. The retrographic sensor of claim 1, wherein the second hardness of the particles is a Shore A hardness greater than 40.

12. The retrographic sensor of claim 1, wherein the first elastomer has a first Shore A hardness at least 10 less than a second Shore A hardness of the particles.

13. The retrographic sensor of claim 1, wherein the first elastomer is an optically clear elastomer.

14. The retrographic sensor of claim 1, wherein the first elastomer includes one or more of silicone rubber, styrenic block copolymer, polyurethane, plastisol, natural rubber, polyisoprene, and polyvinyl chloride.

15. The retrographic sensor of claim 1, further comprising an imaging system coupled to a second surface of the substrate opposing the first surface, the imaging system configured to capture a plurality of images of the deformable layer through the first elastomer and an illumination system configured to illuminate the deformable layer through the first elastomer.

16. The retrographic sensor of claim 1, wherein the contact surface includes non-planar features forming interstitial channels that permit a flow of air between the non-planar features of the contact surface.

17. The retrographic sensor of claim 16 wherein the hardness of the non-planar features is greater than the deformable layer.

18. A retrographic sensor comprising:
a substrate of an optically clear elastomer;
a deformable layer disposed on a surface of the substrate, the deformable layer including a material that reflects light passing through the substrate and incident on the deformable layer; and
a contact surface disposed on the deformable layer, the contact surface having a plurality of microspheres harder than the substrate arranged in a pattern thereon, the pattern having a Q score of at least 2, wherein the Q score is equal to a peak frequency divided by a difference of a pair of half power frequencies of a radially averaged two-dimensional power spectrum of an image of the pattern.

19. The retrographic sensor of claim 18 wherein the microspheres are monodisperse.

20. The retrographic sensor of claim 18 wherein the microspheres have a diameter between 1 and 20 microns.

21. The retrographic sensor of claim 18 wherein at least some of the microspheres are arranged in a planar hexagonal array.

* * * * *

UNITED STATES PATENT AND TRADEMARK OFFICE
CERTIFICATE OF CORRECTION

PATENT NO. : 11,846,499 B2
APPLICATION NO. : 17/193175
DATED : December 19, 2023
INVENTOR(S) : Edward H. Adelson and F. Richard Cottrell It is certified that error appears in the above-identified patent and that said Letters Patent is hereby corrected as shown below:

In the Claims

In Column 14, Lines 37 - 38, Claim 1 delete "the particles are formed of polymethylsilsesquioxane," and insert --the particles formed of polymethylsilsesquioxane,--

Signed and Sealed this
Fourth Day of February, 2025

Coke Morgan Stewart
*Acting Director of the United States Patent and Trademark Office*